(12) United States Patent
Hawks

(10) Patent No.: US 9,771,710 B2
(45) Date of Patent: Sep. 26, 2017

(54) SYSTEM AND METHOD FOR TREATING CONTAMINATED WATER

(71) Applicant: Wasserwerk, Inc., Columbia, MO (US)

(72) Inventor: Wayne R. Hawks, Columbia, MO (US)

(73) Assignee: WASSERWERK, INC., Columbia, MO (US)

( * ) Notice: Subject to any disclaimer, the term of this patent is extended or adjusted under 35 U.S.C. 154(b) by 0 days.

(21) Appl. No.: 14/978,576

(22) Filed: Dec. 22, 2015

(65) Prior Publication Data

US 2016/0107900 A1 Apr. 21, 2016

Related U.S. Application Data

(63) Continuation-in-part of application No. 14/677,683, filed on Apr. 2, 2015, which is a continuation of
(Continued)

(51) Int. Cl.
*E03F 5/10* (2006.01)
*E03F 1/00* (2006.01)
(Continued)

(52) U.S. Cl.
CPC ............... *E03F 5/107* (2013.01); *C02F 9/00* (2013.01); *E03F 1/00* (2013.01); *E03F 5/10* (2013.01);
(Continued)

(58) Field of Classification Search
None
See application file for complete search history.

(56) References Cited

U.S. PATENT DOCUMENTS 4,306,967 A 12/1981 Trautwein
4,631,008 A * 12/1986 Stenner ............... F04B 43/1253
417/477.1
(Continued)

FOREIGN PATENT DOCUMENTS

WO 0216272 A1 2/2002
WO 2009047764 A1 4/2009

OTHER PUBLICATIONS

Best Management Products webpage for BMP SNOUT®, Feb. 3, 2011, 1 page, http://snoutsdirect.com/.

*Primary Examiner* — Chester Barry
(74) *Attorney, Agent, or Firm* — Husch Blackwell LLP

(57) ABSTRACT

A system and method for treating contaminated water are provided. The system can include one or more collecting basins for collecting water, such as rain water, runoff water, etc. The system can further include one or more containment basins, one or more polishing basins, and a pumping system for moving water through the system. The containment basins and polishing basins can utilize techniques for reducing a contaminant concentration in the water. The system can further include a source for adding process water to the system and combining it with the collected water to form a system water in order to reduce a contaminant concentration in the system water and accommodate higher volumes of collected water and/or higher pollutant concentrations therein. The system can also include an ultraviolet emitting device and/or a heating device for reducing the level of living bacteria in the system water.

19 Claims, 7 Drawing Sheets

Related U.S. Application Data application No. 13/627,765, filed on Sep. 26, 2012, now Pat. No. 9,011,681, which is a continuation-in-part of application No. 13/219,080, filed on Aug. 26, 2011, now Pat. No. 8,974,672.

(60) Provisional application No. 62/096,461, filed on Dec. 23, 2014.

(51) Int. Cl.
*C02F 9/00* (2006.01)
*C02F 1/66* (2006.01)
*C02F 1/02* (2006.01)
*C02F 1/32* (2006.01)
*C02F 103/00* (2006.01)

(52) U.S. Cl.
CPC ...... *C02F 1/02* (2013.01); *C02F 1/32* (2013.01); *C02F 1/66* (2013.01); *C02F 2103/001* (2013.01); *C02F 2201/008* (2013.01); *C02F 2209/40* (2013.01); *C02F 2301/063* (2013.01); *C02F 2303/04* (2013.01)

(56) References Cited

U.S. PATENT DOCUMENTS

| | | | |
|---|---|---|---|
| 4,652,381 A | 3/1987 | Inglis | |
| 4,664,795 A | 5/1987 | Stegall et al. | |
| 4,997,568 A | 3/1991 | Vandervelde et al. | |
| 5,133,619 A | 7/1992 | Murfae et al. | |
| 5,281,332 A | 1/1994 | Vandervelde et al. | |
| 5,415,776 A | 5/1995 | Homan | |
| 5,417,861 A | 5/1995 | Burnham | |
| 5,514,277 A | 5/1996 | Khudenko | |
| 5,632,896 A | 5/1997 | Vandervelde et al. | |
| 5,814,227 A | 9/1998 | Pavlis | |
| 6,126,817 A | 10/2000 | Duran et al. | |
| 6,190,548 B1 | 2/2001 | Frick | |
| 7,081,203 B2 | 7/2006 | Helm | |
| 7,288,188 B2 | 10/2007 | Al-Assfour | |
| 7,455,780 B1 | 11/2008 | Joyner et al. | |
| 7,758,747 B2 | 7/2010 | Bryant | |
| 7,857,966 B2 | 12/2010 | Duran et al. | |
| 9,011,681 B2* | 4/2015 | Hawks | C02F 1/66 210/199 |
| 2001/0047956 A1* | 12/2001 | Albiston | B01D 19/00 210/188 |
| 2003/0127391 A1 | 7/2003 | Craft, Sr. et al. | |
| 2004/0134860 A1 | 7/2004 | Hart et al. | |
| 2005/0034651 A1 | 2/2005 | Albiston et al. | |
| 2006/0163178 A1 | 7/2006 | Crawford et al. | |
| 2007/0102276 A1 | 5/2007 | Lubman et al. | |
| 2007/0272609 A1 | 11/2007 | Suri et al. | |
| 2009/0032446 A1 | 2/2009 | Wiemers et al. | |
| 2009/0057237 A1 | 3/2009 | Slabaugh et al. | |
| 2009/0230059 A1 | 9/2009 | McGuire et al. | |
| 2010/0000921 A1 | 1/2010 | Jenkins | |
| 2011/0017677 A1 | 1/2011 | Evans | |
| 2011/0127223 A1* | 6/2011 | Astley | C01B 25/22 210/712 |
| 2011/0290721 A1 | 12/2011 | Aho | |
| 2012/0006762 A1 | 1/2012 | McCabe | |
| 2012/0263804 A1* | 10/2012 | Hospodor | B01D 11/0219 424/725 |

\* cited by examiner

SYSTEM AND METHOD FOR TREATING CONTAMINATED WATER

CROSS-REFERENCE TO RELATED APPLICATIONS

This Application claims priority to U.S. Provisional Application Ser. No. 62/096,461, filed Dec. 23, 2014, to Wayne R. Hawks entitled "System and Method for Treating Contaminated Water," the entire disclosure of which is incorporated herein by reference. This application is also a continuation-in-part of and claims priority to U.S. application Ser. No. 14/677,683, filed Apr. 2, 2015, to Wayne R. Hawks entitled "Self-Contained Irrigation Polishing System," the entire disclosure of which is incorporated herein by reference, which is a continuation of and claims priority to U.S. application Ser. No. 13/627,765, filed Sep. 26, 2012, to Wayne R. Hawks entitled "Self-Contained Irrigation Polishing System," and now U.S. Pat. No. 9,011,681 issued Apr. 21, 2015, the entire disclosure of which is incorporated herein by reference, which is a continuation-in-part of and claims priority to U.S. application Ser. No. 13/219,080, filed Aug. 26, 2011, to Wayne R. Hawks entitled "Self-Contained Irrigation Polishing System," and now U.S. Pat. No. 8,974,672 issued Mar. 10, 2015, the entire disclosure of which is also incorporated herein by reference.

BACKGROUND OF THE INVENTION

Run-off water and wastewater generally contain pollutants and contaminants that have adverse effects on the environment and the surroundings. Therefore, many environmental laws and regulations require run-off water and wastewater to be treated in developed areas before being discharged into a body of water, such as a stream or river. Many water treatment systems are presently known in the art. However, the water treatment systems currently known generally require large amounts of space, are ineffective at treating large volumes of heavily polluted or contaminated water, and cannot easily and effectively eliminate certain bacteria, such as *Escherichia coli*.

Thus, a need exists for a flexible and scalable water treatment system and method for treatment of run-off water and wastewater that is capable of treating large quantities of heavily polluted water in a limited area while also removing various contaminants and eliminating bacteria.

SUMMARY OF THE INVENTION

The present invention relates generally to a water treatment system and method. The water treatment system can be used to treat run-off water, storm water, drainage water, wastewater, contaminated water and the like. According to one embodiment of the present invention, the treatment system can include one or more small-scale containment basins for collecting water via various collection means. The water collected by the small-scale containment basins can then be transferred to a first large-scale containment basin, which can be one in a series of large-scale containment basins. Upon entering the first large-scale containment basin, the collected water can be combined with process water from another source to form the system water. The process water can be provided by a well, river, stream, pond, lake or other source of generally uncontaminated water or water having a contamination or pollutant concentration that is less than a contamination or pollutant concentration of the collected water. The system water can then be pumped through the one or more large-scale containment basins and one or more polishing basins to reduce the concentration of contaminants and/or pollutants in the system water, after which it can be released from the system or reinserted into the system as the process water.

According to one embodiment of the present invention, the inclusion of the process water into the system can be controlled by a variable control valve. The control valve can selectively control the amount of process water added based on various criteria. In one embodiment, the flow rate of added process water is at least partially based on the flow rate of collected water into the first large-scale containment basin. According to another embodiment of the present invention, the control valve can selectively control the amount of process water added to the system based on the concentration of contaminants and/or pollutants in the collected water entering the first large-scale containment basin.

The system can also incorporate a device for treating the system water with ultraviolet light to kill certain bacteria and other micro-organisms present in the system water. In addition to the ultraviolet device, or alternatively, the system can also incorporate a device for heating the system water to kill certain bacteria and other micro-organisms.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
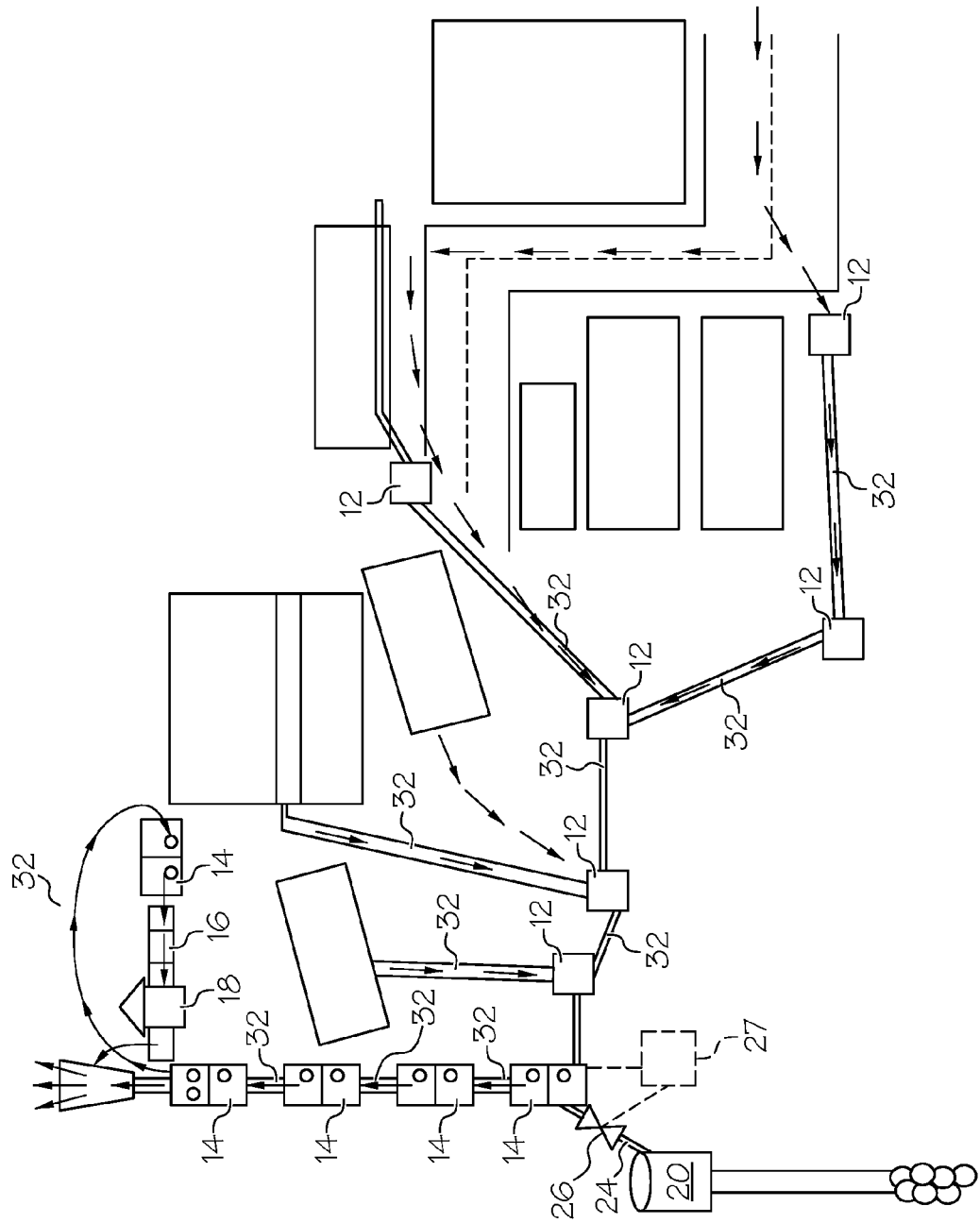
FIG. 1 is a schematic plan view of a water treatment system and the surrounding environment in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a general schematic of a water treatment system 10 of the present invention and demonstrates how it can operate with respect to a surrounding environment. System 10 generally works by collecting run-off water, such as storm water, wastewater, drainage water, etc., combining the collected water with processed water from another source and passing the water through various treatment systems by means of a pumping system, such as a vacuum pumping system, a negative pressure system, and/or a positive pressure system, until the water is fit for release into the environment. The run-off water, or collected water 100, can be collected by various means and transferred to containment basins ("CBs"). In FIG. 1, collected water 100 is schematically shown as flowing from buildings, parking lots, and roadways and being collected in a series of small-scale CBs 12 interconnected with one another. Collected water 100 can then flow from small-scale CBs 12 to large-scale CBs 14, where it can be combined with process water 102 from another source such as well 20, or other source of generally uncontaminated water (or less contaminated water) to form system water 104. From large-scale CBs 14, system water 104 (the combined collected water and process water) can be pumped under vacuum through a vacuum pumping system to one or more polishing basins 16, and can be treated with ultraviolet light and/or heat to kill certain bacteria and other micro-organisms. In alternative embodiments, system water 104 can be pumped using any number of other suitable pumping means employing a positive or negative pressure system. The term "polishing" is used herein to refer to a treatment process that involves, among other things, the removal of harmful pollutants that prevent the growth of vertebrate and invertebrate organisms in a stream or body of water. By eliminating undesirable chemicals from the collected water, the water is "polished." After passing through the polishing basins 16, the water may be tested for specific impurities.

In system 10, water can be moved from the surface to containment basins that can be located underground, above ground, or some combination of the two, where the water can go through a polishing process before it is released from the treatment site into a stream, river, or other water source. In some embodiments, the water may be guided to an open air concrete fish tank loaded with different species of fish, for purposes of testing the treatment process, before being released from the site. The treated water can also be reinserted into the system as process water in certain embodiments.

Figure 2:
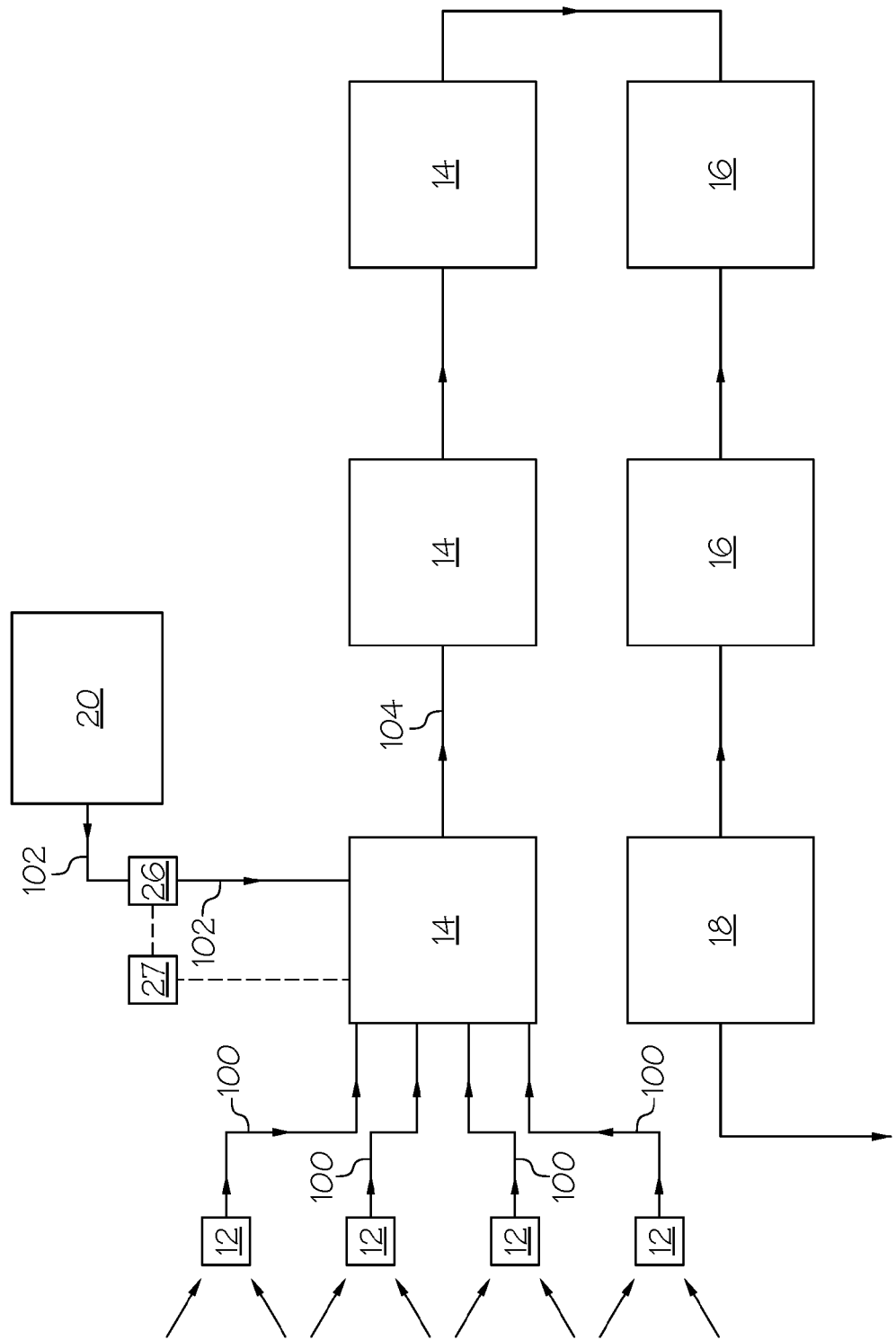
FIG. 2 is a schematic plan view of a water treatment system in accordance with another embodiment of the present invention.

FIG. 2 schematically illustrates water treatment system 10 according to one embodiment of the invention. Run-off water is collected and drained into one or more small-scale CBs 12 as collected water 100. Collected water 100 can then be guided from small-scale CBs 12 to one or more large-scale CBs 14. In one embodiment, as best shown in FIG. 2, several small-scale CBs 12 can be utilized to collect water 100 and guide it to a first large-scale CB 14 of a series of large-scale CBs 14. However, it is recognized that several other alternative arrangements of small-scale CBs 12 and large-scale CBs 14 may be used. In each embodiment any or all of the CBs 12 and 14 can be partially filled with limestone rock or calcium carbonate ($CaCO_3$) material in order to increase the pH of the water 100 and/or 104, and cause pollutants in the water 100, 104 to be precipitated.

When collected water 100 from small-scale CBs 12 enters the large-scale CBs 14, it can be combined or mixed with process water 102 from a process water source 20 in order to form system water 104. In the embodiment shown in FIGS. 1-4, process water source 20 is in the form of a well. Alternatively, process water 102 can come from another source 20, such as a river, stream, lake, pond, or any body of water. Additionally, process water 102 can have multiple sources, and it can be added at various CBs 14 or other locations throughout system 10. As shown in FIG. 2, process water 102 can be pumped, via a positive or negative pressure system, from well 20 through a well pipe or conduit 24 to a CB well inlet 34, where it enters large-scale CB 14. In another embodiment, process water 102 may be fed via gravity. The flow rate of process water 102 from well 20 can be controlled by a variable control valve 26 that can be manually or automatically operable. By adding process water 102 from well 20 (or any other outside source) to large-scale CB 14 so that it combines with collected water 100 from small-scale CBs 12, water treatment system 10 can be capable of effectively treating large quantities of heavily polluted or contaminated water in a small area. Without the addition of well 20, or alternative source of generally uncontaminated water 102, water treatment system 10 described and those similarly known in the prior art are often incapable of treating a large quantity of water that contains high levels of pollutants.

The amount of process water 102 pumped from well 20 and added to the collected water 100 can depend on the inflow volume of collected water 100 and the concentration of pollutants or contaminants therein. As the volume of collected water 100 that enters system 10 increases, the volume of added process water 102 can also be increased. Additionally, as the level of pollution or contamination of collected water 100 entering system 10 increases, the volume of process 102 water can also increase. At certain times, no process water 102 may be necessary for system 10 to effectively treat collected water 100. When process water 102 is necessary, variable control valve 26 can control the amount of water 102 that flows from source 20 to large-scale CB 14. Variable control valve 26 can be operated manually or by a computer. For example, a control device 27 can detect the flow rate of collected water 100 traveling into first CB 14 and adjust the flow rate of process water 102 entering CB 14 via control valve 26. In addition to or alternatively, control device 27 can detect the concentration of pollutants and/or contaminants in collected water 100 traveling into first CB 14 and adjust the flow rate of process water 102 entering CB 14 via control valve 26.

Figure 3:
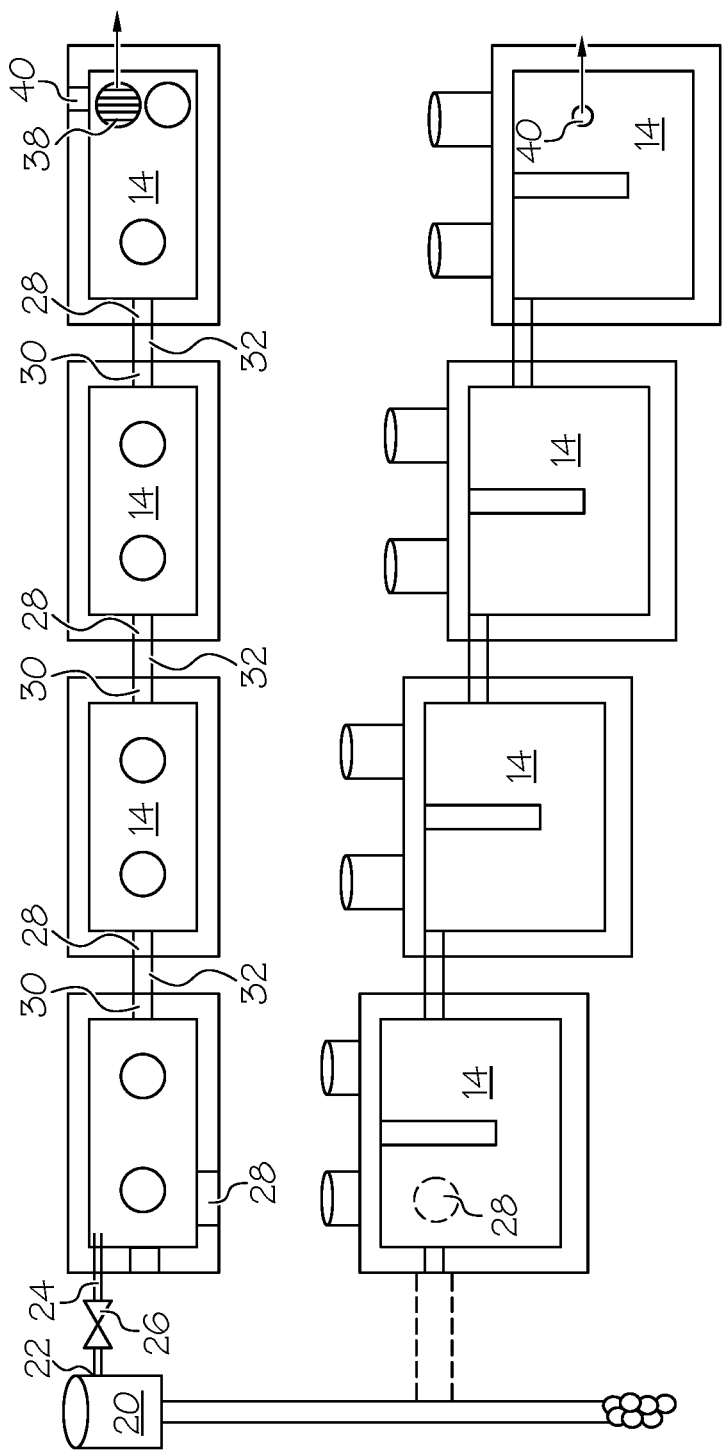
FIG. 3 is a schematic illustration of a series of containment basins in accordance with one embodiment of the present invention.
Figure 4:
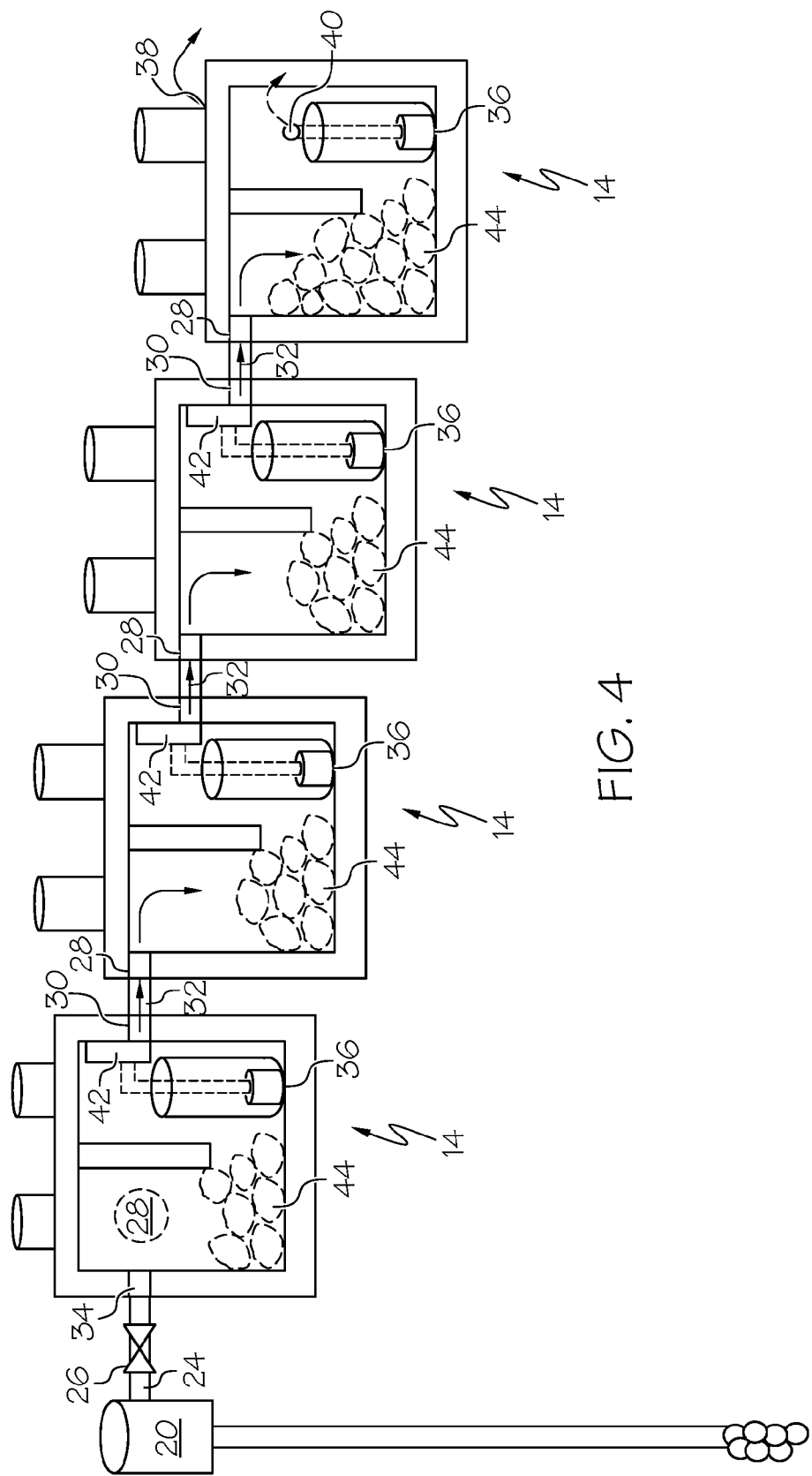
FIG. 4 is a schematic side view of the series of containment basins in FIG. 3.

The general layout of large-scale CBs 14 is illustrated schematically in FIGS. 3 and 4, according to one embodiment of the present invention. Each large-scale CB 14 can be a rectangular container, for example, one formed of concrete. However, it is recognized that many other shapes and materials are suitable for large-scale CBs 14. Each large-scale CB 14 has an inlet 28 and an outlet 30. Where a series of large-scale CBs 14 is used, outlet 30 of a preceding large-scale CB 14 can be connected to inlet 28 of the next large-scale CB 14 by conduit 32, which can be, for example, PVC piping.

Optionally, the last large-scale CB 14 in a series, or the sole large-scale CB 14 if only one is used, can include a first exit orifice 38 and/or a second exit orifice 40 in place of outlet 30, as best shown in FIGS. 3 and 4. System water 104 flowing from this large-scale CB 14 can be divided and diverted in different directions. First orifice 38, which can simply be an opening or an opening filled with a grate, can direct part or all of the system water to an outside body of water, such as a stream or river that carries it away from the site. This system water 104 can be exposed to additional limestone or other material prior to being diverted to the aforementioned body of water. The second exit orifice 40 can direct the remaining system water to an additional large-scale CB 14 by means of a vacuum pumping system 18.

The bottom of each CB 14 can be lined with limestone rock 44 or calcium carbonate ($CaCO_3$). The limestone rock 44 can cause unidentified pollutants and street salt to be converted to sodium bicarbonates/carbonates, calcium chloride, and sodium hydroxide which will act to increase the pH of the system water 104 and can cause the pollutants in the system water to be precipitated. Each large-scale CB 14 can also be provided with a pump 36 to move system water from the interior of the large-scale CB 14 out of its outlet 28. Pump 36 can operate on a positive or negative pressure basis. In addition, large-scale CBs 14 can be provided with varying substrates 42 designed to attract and absorb particular contaminants, such as for example oil or antifreeze. Each large-scale CB 14 can contain a single substrate 42 or multiple substrates 42 directed at different contaminants.

Figure 6:
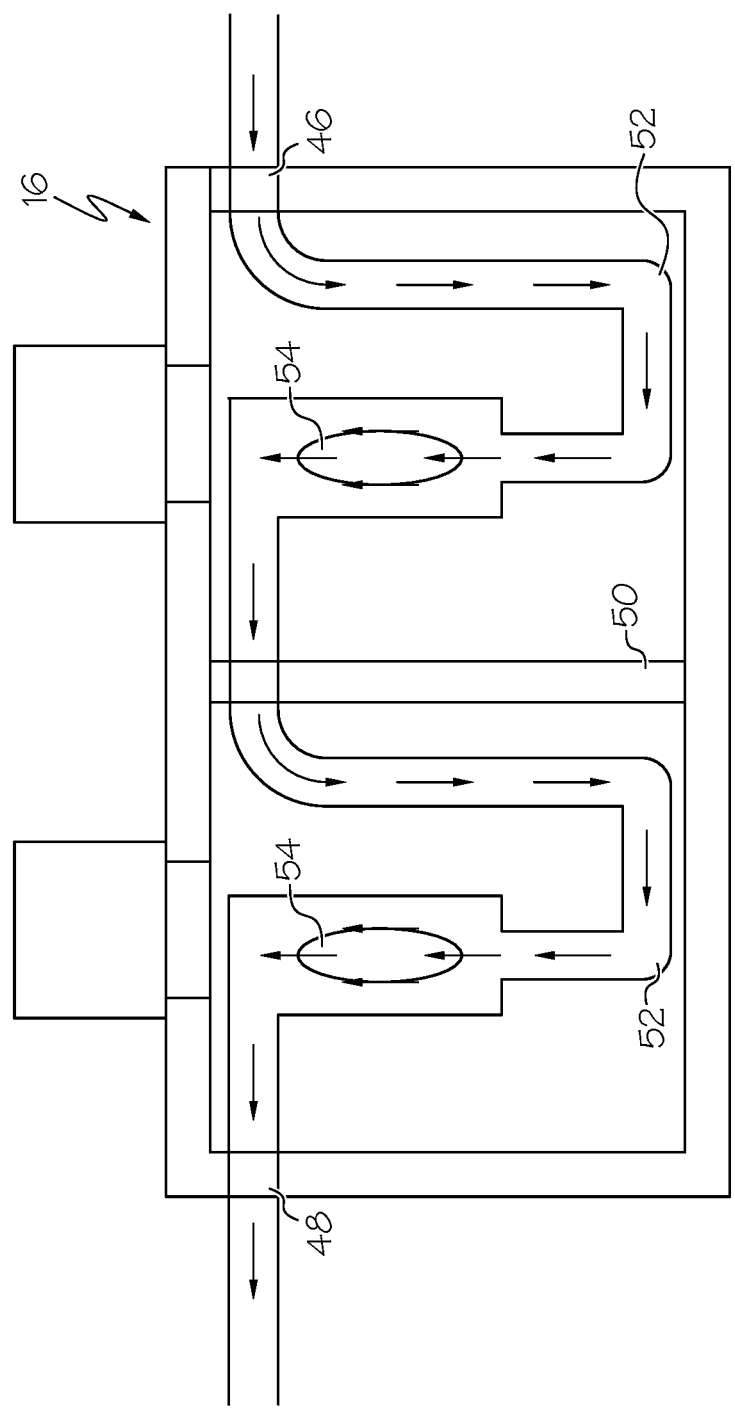
FIG. 6 is a schematic side view of a polishing basin in accordance with one embodiment of the present invention.

After passing through large-scale CBs 14, system water 104 can then be directed toward one or more polishing basins 16. Any or all of the polishing basins 16 may be provided with one or more substrates 54 for further polishing of system water 104. FIG. 6 schematically illustrates a polishing basin 16 for use in water treatment system 10. Each polishing basin can be a rectangular container or tank and can be formed from concrete, for example, with an inlet 46 and an outlet 48. It is understood however that polishing basins 16 can have a non-rectangular shape and can be constructed from a suitable material other than concrete. Each polishing basin 16 can also include a baffle wall 50. Baffle wall 50 divides the interior of polishing basin 16 into two parts and can be provided with an opening therein to allow water to flow from one part of the interior to another part of the interior. In one embodiment, the opening is at a relatively high point of the baffle wall 50. In a preferred embodiment, polishing basin 16 is provided with a plumbing conduit 52—schematically indicated in FIG. 6—which can direct water 104 (on a positive or negative pressure basis) through the polishing basin 16 from one part of the interior, through the opening in the baffle wall 50, into the second part of the polishing basin 16 interior, and out through the outlet 48. One or more of the polishing basins 16 can include one or more substrates 54 that water 104 is exposed to as it passes through the polishing basin 16 interior. Substrates 54 can be selected to address specific contaminants relevant to the local environment.

Figure 5:
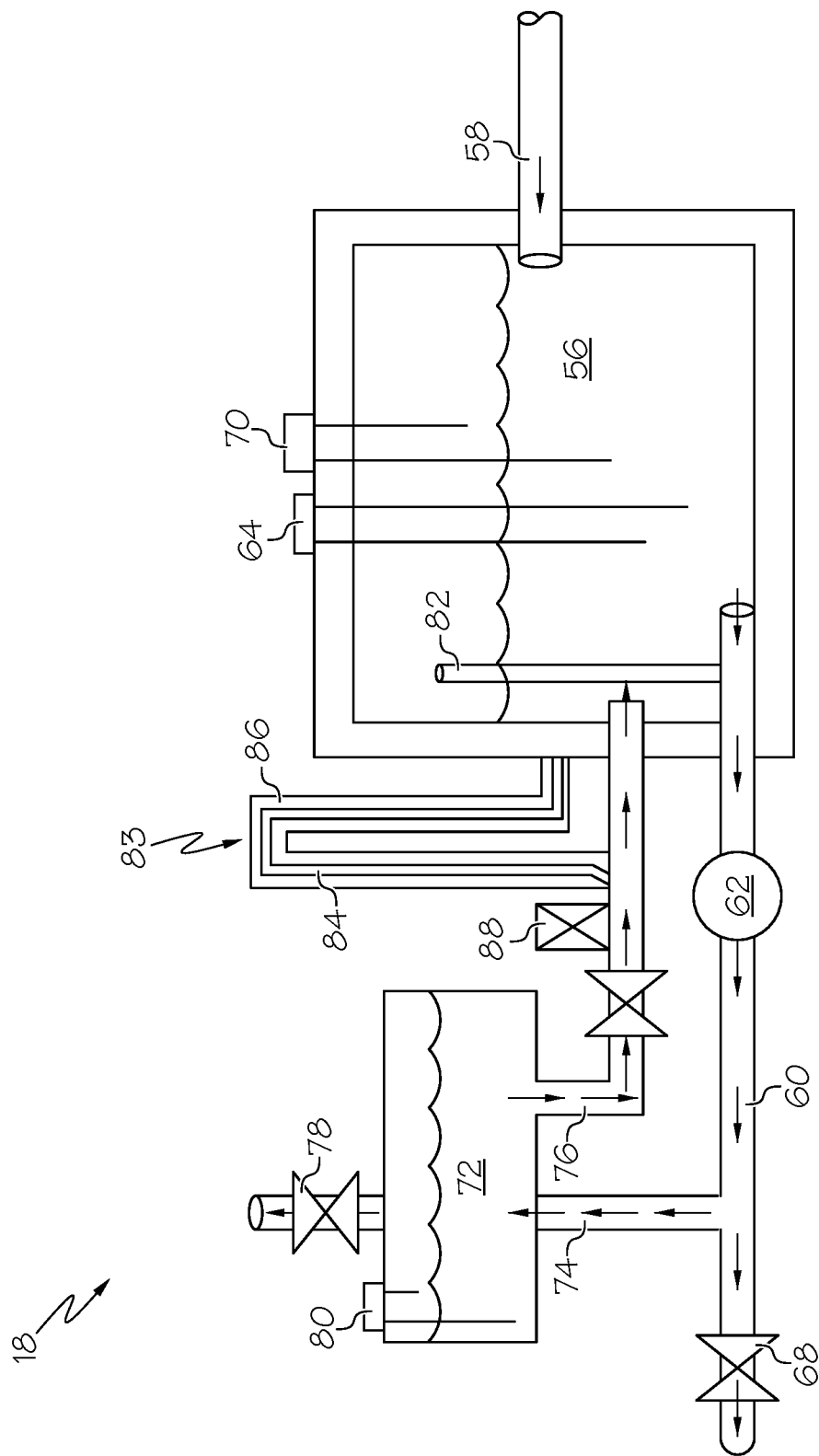
FIG. 5 is a schematic side view of a vacuum pumping system in accordance with one embodiment of the present invention.

According to one embodiment of the present invention, water 104 from large-scale CBs 14 can be directed to polishing basins 16 by virtue of vacuum pumping system 18. Vacuum pumping system 18 can create a vacuum throughout the polishing basins 16 to draw water 104 through those containers. FIG. 5 schematically illustrates an exemplary vacuum pumping system 18. Vacuum pumping system 18 can include a vacuum tank 56 having an inlet 58 that can communicate with the outlet of the last polishing basin 16. An outlet pipe 60 can allow water to flow from the vacuum tank 56. A vacuum pump 62 can be located in outlet pipe 60. Vacuum pump 62 can be controlled by a switch 64 that can be located in vacuum tank 56. Outlet pipe 60 can lead to both a water outlet valve 68 and an inlet 74 to a separator tank 72. Separator tank 72 can also include an outlet 76 that leads from separator tank 72 back to vacuum tank 56. Separator tank 72 can also be provided with a bleed valve 78 that may be operated by a switch 80 in separator tank 72. Water outlet valve 68 can also be controlled by a switch 70.

Each of the switches 64, 70, and 80 referenced above can be an anode/cathode switch, as shown in FIG. 5. In this embodiment, each switch is opened or closed by contact of the anode or cathode of the switch with water 104 in system 10 as described below.

Vacuum pumping system 18 can also include an ultraviolet light emitting device 83 for killing certain bacteria and other micro-organisms in the water 104. In the embodiment shown in FIG. 5, ultraviolet light emitting device 83 is located at separator tank outlet 76. However, ultraviolet light emitting device 83 can be located anywhere in vacuum pumping system 18, or even at another location along water treatment system 10, such as at a CB 14 or at a polishing basin 16. Ultraviolet light emitting device 83 can include a pipe conduit 84, such as a clear plastic pipe, that contains an ultraviolet light 86. Ultraviolet light emitting device 83 can operate by emitting ultraviolet light 86, at one or more various short-wave lengths, for a sufficient time to effectively kill specific bacteria, such as *Escherichia coli*, thereby allowing system 10 to effectively eliminate specific harmful bacteria from system water 104. The amount of ultraviolet light 86 emitted into system water 104 can be varied depending on the flow rate of system water 104 and/or the amount of bacteria or micro-organisms in system water 104, or it may be emitted at a constant rate. In addition or alternative to ultraviolet light emitting device 83, system 10 can also include a heating component 88 for killing certain bacteria and other various micro-organisms. In an alternative embodiment, only a heating component 88 is used for killing bacteria and micro-organisms. Heating component 88 can be located in conjunction with ultraviolet light emitting device 83 or be located separately at another location in system 10. Heating component 88 can incorporate any type of heating element that is suitable for heating and killing bacteria and other micro-organisms in water 104.

Vacuum pumping system 18, as shown in FIG. 5, can operate in the following manner. Water 104 can be drawn into vacuum tank 56 by operation of vacuum pump 62 and gravity. In an alternative embodiment, pumping system 18 can push the water through rather than draw it through. At this time, water outlet valve 68 can be closed to prevent water 104 from exiting vacuum pumping system 18. This can allow water 104 to build up in vacuum tank 56 and separator tank 72. As water 104 flows into separator tank, it can contact bleed valve switch 80 anode, which can open bleed valve 78 to allow air in vacuum pumping system 18 to escape to atmosphere. Water 104 in separator tank 72 can flow through the connecting conduit back to vacuum tank 56, but at a rate slower than the rate of flow into separator tank 72. The water level in separator tank 72 can thus rise and contact the cathode of bleed valve switch 80 to close bleed valve 78. Air in the system can be released through stand pipe 82, and a vacuum in the system is created. As water 104 continues to build in vacuum tank 56, and it can reach the cathode of water outlet valve switch 70, resulting in water outlet valve 68 being opened and allowing water 104 to flow out of vacuum tank 56 until the water level in tank 56 drops below the cathode of valve switch 70, which can close water outlet valve 68 and allow water 104 to build up once again within vacuum tank 56.

When water 104 leaves vacuum pumping station 18, it can be released from the site into a stream, river, or other body of water, including the aforementioned body of water.

Figure 7:
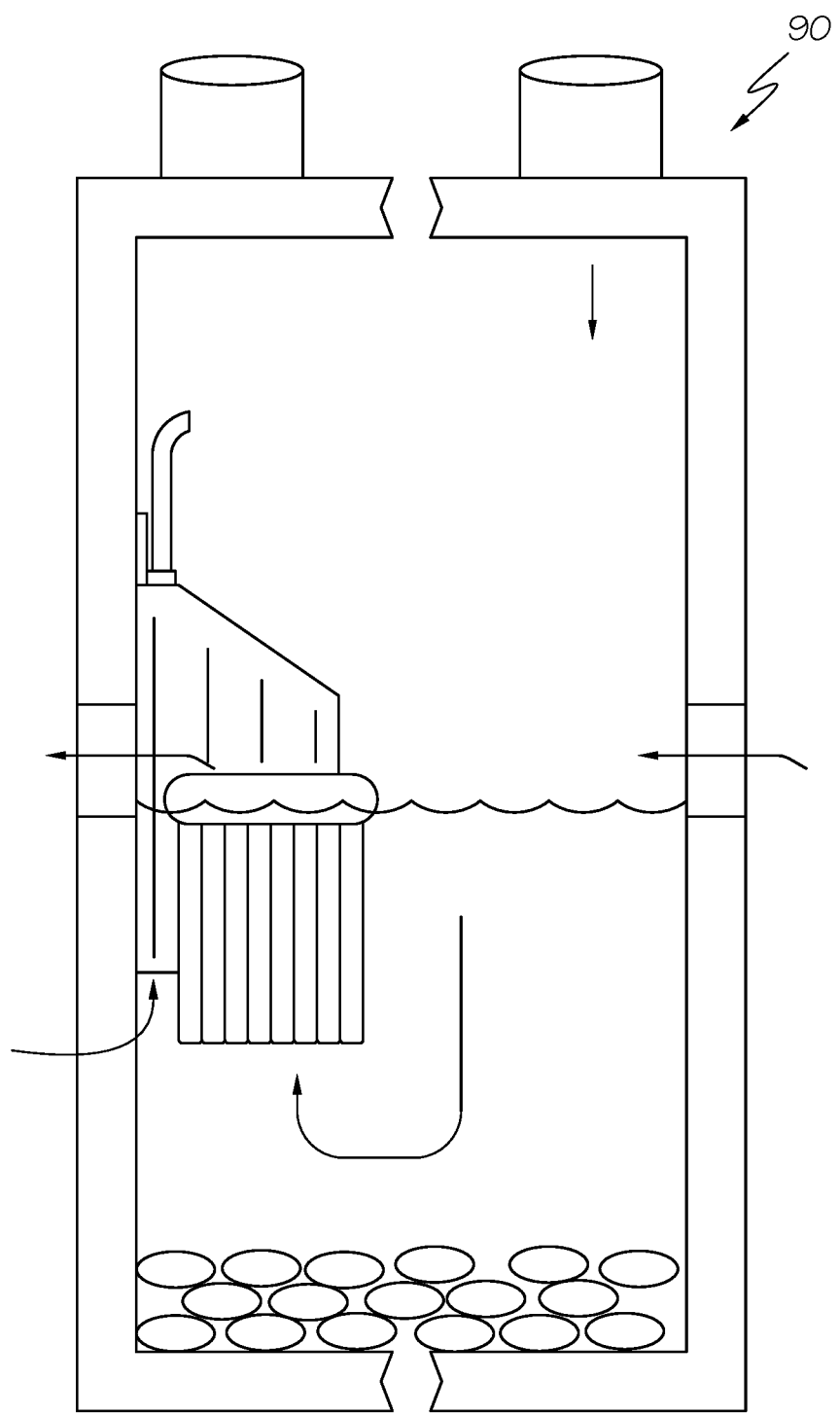
FIG. 7 is a schematic side view of a mechanical containment separation device in accordance with one embodiment of the present invention.

The outlets of any or all of the various containment basins 14 and polishing basins 16 can be provided with a mechanical containment separation device 90, an example of which is shown in FIG. 7. Such a mechanical containment separation device is described in U.S. Pat. No. 8,974,672.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A water treatment system comprising:
    a collection source for collecting a collected water, said collected water having a first contamination concentration;
    at least one containment basin having an inlet for inflow of collected water from said collection source;
    a water supply for providing process water to said at least one containment basin, wherein said process water is provided from at least one of a well and a natural water source; and
    at least one polishing basin in fluid communication with said at least one containment basin, said at least one polishing basin configured for removing pollutants from system water, said system water comprising at least one of said collected water and said process water.

2. The system of claim 1 further comprising a vacuum pumping station in fluid communication with said polishing basin and said containment basin and configured for drawing said system water through said water treatment system.

3. The system of claim 1 further comprising an ultraviolet emitting device configured for reducing the amount of living bacteria in said system water.

4. The system of claim 3, wherein said ultraviolet emitting device comprises an ultraviolet light within a clear plastic conduit.

5. The system of claim 1 further comprising a heating device configured for reducing the amount of living bacteria in said system water.

6. The system of claim 1, wherein a flow rate of process water provided to said at least one containment basin is controlled by a variable control valve.

7. The system of claim 6, wherein said variable control valve controls said flow rate of process water based on a flow rate of said collected water entering said at least one containment basin.

8. The system of claim 6, wherein said variable control valve controls said flow rate of process water based on a pollutant concentration of said collected water entering said at least on containment basin.

9. The system of claim 1, wherein said process water has a second contamination concentration that is less than said first contamination concentration.

10. A method of treating water, said method comprising the steps of:
    collecting run-off water from a site;
    delivering said run-off water to a containment basin;
    adding a process water to said containment basin, said process water being delivered from at least one of a well and a natural water source;
    combining said run-off water with said process water in said containment basin to form a system water;
    increasing a pH of said system water in said containment basin;
    drawing said system water through said containment basin into at least one polishing basin using a pump;
    removing contaminants from said system water in said at least one polishing basin; and
    discharging said system water into a body of water.

11. The method of claim 10 further comprising the step of applying an ultraviolet light to said system water to reduce an amount of living bacteria in said system water.

12. The method of claim 10 further comprising the step of heating said system water to reduce an amount of living bacteria in said system water.

13. The method of claim 10 further comprising the step of controlling an amount of said process water added to said containment basin by means of a variable control valve.

14. The method of claim 13, wherein said step of controlling said amount of said process water added to said containment basin includes determining a flow rate of said run-off water entering said containment basin.

15. The method of claim 13, wherein said step of controlling said amount of said process water added to said containment basin includes determining a concentration of pollutants in said run-off water entering said containment basin.

16. A water treatment system comprising:
    a collection source for collecting a collected water, said collected water having a first concentration of pollutants;
    a first containment basin configured for receiving said collected water at a first flow rate;
    a water supply for providing a process water to said first containment basin;
    a variable control valve for selectively allowing a flow rate of said process water into said first containment basin; and
    a control device configured for controlling said variable control valve;
    wherein said variable control valve is at least partially controlled based on at least one of said first flow rate of said collected water and said first concentration of pollutants in said collected water.

17. The system of claim 16 further comprising an ultraviolet emitting device for reducing an amount of living bacteria in system water, said system water comprising at least one of said collected water and said process water.

18. The system of claim 16 further comprising a heating device for reducing an amount of living bacteria in system water, said system water comprising at least one of said collected water and said process water.

19. The system of claim 16, wherein said process water has a second concentration of pollutants, said second concentration of pollutants being less than said first concentration of pollutants.

* * * * *